UNITED STATES PATENT OFFICE.

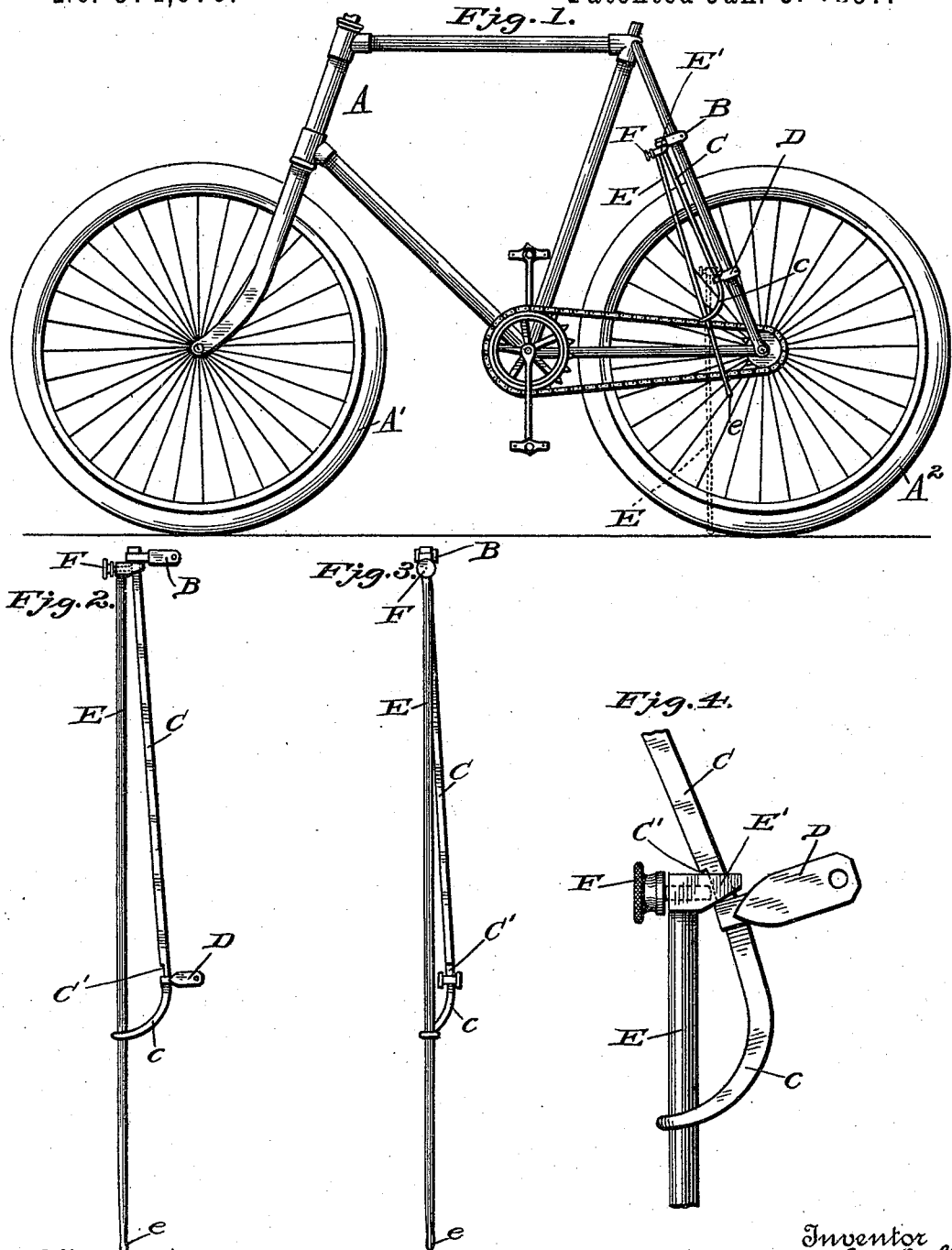

JOHN M. GETCHELL, OF HAVERHILL, NEW HAMPSHIRE, ASSIGNOR OF ONE-HALF TO WILLIAM W. CROOK, OF SAME PLACE.

BICYCLE-SUPPORT.

SPECIFICATION forming part of Letters Patent No. 574,676, dated January 5, 1897.

Application filed March 27, 1896. Serial No. 585,110. (No model.)

*To all whom it may concern:*

Be it known that I, JOHN M. GETCHELL, a citizen of the United States, residing at North Haverhill, in the county of Grafton and State of New Hampshire, have invented certain new and useful Improvements in Bicycle-Supports; and I do hereby declare the following to be a full, clear, and exact description of the invention, such as will enable others skilled in the art to which it appertains to make and use the same.

This invention relates to certain new and useful improvements in bicycle-supports of that class which are designed to be attached to and carried with the bicycle, but capable of ready detachment, when desired, for repair or other purposes.

It has for its objects, among others, to provide a simple and cheap yet strong and durable and efficient support easily applied or removed when desired, and which is adapted for use in connection with wheels of different diameters. The lower end of the rest or support is curved forward and outward, so as to throw the support away from the path of the chain and also to throw it downward to make the point of support as near the ground as possible and avoid liability of injury or breakage by undue strains. When the rest is down, it braces six or eight inches, more or less, above the wheel and avoids tendency of the wheel to trip or slide upon the ground. The rest is practically self-adjusting when the set-screw is loosened, and by adjusting it either to right or left on the frame will bring the frame into the desired angle, and the parts are so constructed that when the rest is down it is practically self-locked.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of a portion of a bicycle, showing my rest applied thereto. Fig. 2 is a side elevation of the rest in its closed condition. Fig. 3 is a view at right angles to Fig. 2. Fig. 4 is an enlarged detail showing the clasp and the two portions of the support.

Like letters of reference indicate like parts in the several views.

Referring now to the details of the drawings by letter, A designates portions of the frame of a bicycle of known construction.

A' is the front wheel, and A² is the rear wheel, also of any well-known or suitable form of construction.

B is a clamp adapted to be engaged about the rear vertical bar of the frame, as shown, at any desired position, being vertically adjustable thereon and secured in position by the binding-screw, and this clamp is held on the upper end of the slide-rod C, which is preferably rectangular in cross-section, as shown, and its lower end is curved in two directions, forwardly and outwardly, as seen at c, and near its lower end has attached thereto the clamp or clasp D, which is designed to be secured about the rear bar of the bicycle, as shown. The lower outer end of this curved portion is provided with an opening in which the rest E is designed to slide. This rest has its lower end preferably pointed or otherwise constructed, as seen at e, so as to effect a firm hold upon the ground or floor, and at its upper end is provided with the lateral extension E', having an opening therethrough to receive the bar or rod C, and provided with a thumb-screw F, extending horizontally through the same and adapted to engage the rod C and hold the rest in any desired position.

The rod C, near the clamp B, is provided with a shoulder or offset C', as seen best in Figs. 2, 3, and 4, so that when the rest slides down into its lowermost position the lateral portion E' thereof will be received in this notch, and the thumb-screw engages therein, and, furthermore, by this construction when the rest drops down into such position it is practically self-locking, the parts falling into the position seen in Fig. 4, and the upper wall of the notch engaging over the top edge of the lateral portion E' of the rest holds the same in its lowermost position, and the rest stands practically vertical, so as to prevent tilting or sliding of the wheel.

Modifications in details may be resorted to without departing from the spirit of the invention or sacrificing any of its advantages.

Having thus described the invention, what is claimed as new is—

1. A bicycle-support consisting of a bar having means for attachment to the frame of a bicycle and curved near its lower end, and a rest mounted to slide through an opening in the curved portion, and having at its upper end a lateral portion receiving the rod, substantially as described.

2. A bicycle-support consisting of a bar having means for attachment to the frame of a bicycle and curved near its lower end, and a rest mounted to slide through an opening in the curved portion, and having at its upper end a lateral portion receiving the rod, and provided with set-screws, substantially as described.

3. A bicycle-support consisting of a rod provided with clamps for its attachment with the frame of a bicycle having its lower end curved in two directions, and a rest mounted to slide on the rod and pass loosely through an opening in the curved portion, and having a thumb-screw at its upper end, substantially as described.

4. A bicycle-support consisting of a rod provided with clamps for its attachment to the frame of a bicycle having its lower end curved in two directions, and a rest mounted to slide on the rod and pass loosely through an opening in the curved portion, and having a thumb-screw at its upper end, the said rod having a notch near its lower clamp, substantially as described.

In testimony whereof I have signed this specification in the presence of two subscribing witnesses.

JOHN M. GETCHELL.

Witnesses:
CHARLES NEWCOMB,
WILLIAM W. CROOK.